(12) United States Patent  
Schulten

(10) Patent No.: US 11,879,433 B2
(45) Date of Patent: Jan. 23, 2024

(54) METHOD FOR OPERATING A WIND TURBINE, AND A POWER PLANT

(71) Applicant: General Electric Renovables Espana, S.L., Barcelona (ES)

(72) Inventor: Christoph Schulten, Salzbergen (DE)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/741,710

(22) Filed: May 11, 2022

(65) Prior Publication Data

US 2022/0364543 A1 Nov. 17, 2022

(30) Foreign Application Priority Data

May 12, 2021 (EP) .................................... 21173681

(51) Int. Cl.
*F03D 7/02* (2006.01)

(52) U.S. Cl.
CPC ...... *F03D 7/0284* (2013.01); *F05B 2220/706* (2013.01); *F05B 2270/1033* (2013.01); *F05B 2270/337* (2013.01)

(58) Field of Classification Search
CPC .............. F03D 7/0284; F05B 2220/706; F05B 2270/1033; F05B 2270/337
See application file for complete search history.

(56) References Cited

U.S. PATENT DOCUMENTS

| 9,279,411 | B2* | 3/2016 | Beekmann | H02J 3/241 |
| 2005/0254191 | A1* | 11/2005 | Bashaw | H02J 3/381 |
| | | | | 361/62 |
| 2012/0104756 | A1* | 5/2012 | Beekmann | F03D 9/255 |
| | | | | 290/44 |

(Continued)

FOREIGN PATENT DOCUMENTS

| EP | 2884096 A1 | 6/2015 |
| WO | WO2010108910 A2 | 9/2010 |

(Continued)

OTHER PUBLICATIONS

European Search Report Corresponding to EP21173681 dated Nov. 5, 2021.

*Primary Examiner* — Tulsidas C Patel
*Assistant Examiner* — Thomas K Quigley
(74) *Attorney, Agent, or Firm* — Dority & Manning, P.A.

(57) ABSTRACT

A method (1000-1001) for operating a wind turbine (100) including a rotor (106) having rotor blades (108) and a power conversion system (118, 210, 234) mechanically connected with the rotor (106), configured to convert input motive power into electrical output power, and electrically connected to a network (242) for feeding the electrical output power (P) to the network is provided. The method includes determining (1100) a current frequency (f) of the network (242), and, when the current frequency (f) is equal to or lower than a threshold frequency ($f_{thresh}$), operating (1300) the power conversion system (118, 210, 234) at an electrical output power (P) which is increased by an elec- (Continued)

trical output power increase (PI) in accordance with a monotonic function (PI(f)) of the current frequency (f) limited to a maximum value ($PI_{max}$).

13 Claims, 5 Drawing Sheets

(56) References Cited

U.S. PATENT DOCUMENTS

| | | | | |
|---|---|---|---|---|
| 2013/0154263 | A1* | 6/2013 | Attia | F03D 7/0272 |
| | | | | 290/44 |
| 2016/0169199 | A1* | 6/2016 | Beekmann | F03D 1/06 |
| | | | | 290/44 |
| 2016/0312767 | A1* | 10/2016 | Wilson | F03D 9/25 |
| 2017/0329289 | A1* | 11/2017 | Kohn | F24F 11/46 |

FOREIGN PATENT DOCUMENTS

| | | |
|---|---|---|
| WO | WO2016202338 A1 | 12/2016 |
| WO | WO2017118460 A1 | 7/2017 |

* cited by examiner

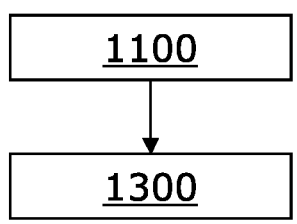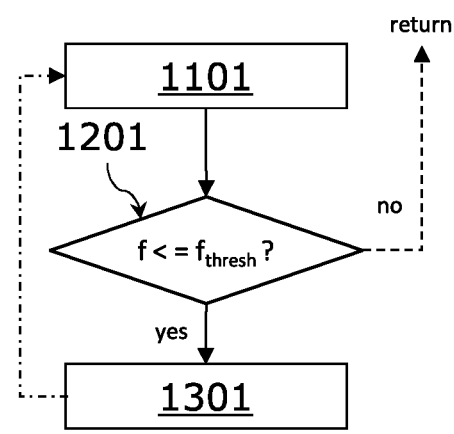
FIG 5A
FIG 5B

METHOD FOR OPERATING A WIND TURBINE, AND A POWER PLANT

FIELD

The present subject matter relates generally to operating wind turbines, and more particularly to operating wind turbines in accordance with grid code requirements, and to corresponding power plants, in particular wind power plants.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid often also referred to as (supply) network.

With the often-desired increasing share of renewable energy sources such as wind farms and solar farms in electric power generation, which rely on not controllable power sources ("wind" and "sun"), compliance with grid requirements becomes more important. This particularly refers to imbalances between the electrical power fed into a grid and the electrical power withdrawn from it by consumers as this may result in fluctuations of the grid frequency. For example, the grid frequency drops when the power consumption exceeds electrical power fed into the grid. For stability reasons, fluctuations of the grid frequency around a desired or target grid frequency of e.g. 50 Hz for Central European grids and 60 Hz for US grids are to be kept within certain limits of at most a few percent. Accordingly, grid operators typically specify primary power control requirements for the electric power generation plants in so-called grid codes which may change over time and typically also depend on the region and country, respectively.

Kinetic energy that is or may additionally be stored in rotating parts of electric power generation plants such as a rotor of a wind turbine may be used as a power reserve that can be used for (partly) compensating a deviation of the grid frequency, by de-accelerating and accelerating the rotor, however only for a short time to avoid too low and too high rotor speeds.

However, the current implementation of the respective grid code requirements leaves room for further developments.

Accordingly, the present disclosure provides a method for operating a wind turbine, a power plant, and a computer program product or a computer-readable storage medium as disclosed and claimed herein.

BRIEF DESCRIPTION

Aspects and advantages of the invention will be set forth in part in the following description, or may be obvious from the description, or may be learned through practice of the invention.

In one aspect, the present disclosure is directed to a method for operating a wind turbine. The wind turbine includes a rotor having rotor blades, and a power conversion system mechanically connected with the rotor, configured to convert input motive power into electrical output power, and electrically connected to a network for feeding the electrical output power to the network. The network is typically a utility grid. The method includes determining a current frequency of the network, and, when the current frequency is equal to or lower than a threshold frequency, operating the power conversion system at an electrical output power which is increased by an electrical output power increase in accordance with a monotonic function of the current frequency. The monotonic function is limited to a maximum value.

Accordingly, in particular large wind turbines having large rotatable masses and correspondingly large moments of inertia respectively, which can store considerably amounts of kinetic energy, and/or wind power plants or hybrid power plants having several, typically a plurality of wind turbines may quickly and efficiently contribute to stabilizing the grid frequency during an underfrequency event without damaging the wind turbine(s) due to limiting the power increase of the monotonic function. Within this specification the term "power plant" shall embrace the term "power conversion plant", "wind farm", "wind power plant" and "hybrid power plant".

Operating the power conversion system at an electrical output power which is increased by an electrical output power increase (in accordance with the monotonic function of the frequency) may also be referred to as operating the wind turbine in an overproduction operating mode in which the electrical output power of the power conversion system is increased by (providing, e.g. reducing) kinetic energy stored in the power conversion system but limited to a lower value than possible.

Typically, at least one of, more typically both of a rotational energy stored in a moment of inertia of the rotor, and a rotational energy stored in a moment of inertia of a generator rotor of a generator of the power conversion system is used to provide the electrical output power increase.

In particular, at a first time at which the current frequency of the network is determined to be equal to or lower than the threshold frequency or shortly thereafter, typically in real time, i.e. within less than about than 0.5 s or even 0.2 s, or in near real-time, i.e. within less than about 5 s or even less than 2 s and at the next possible time of the control, respectively, the electrical output power of the power conversion system is increased by the electrical output power increase (provided by/converted from the kinetic energy stored in the power conversion system).

The maximum value, also referred to as limited power increase value, may be determined as a function of a rated power of the power conversion system and the wind turbine, respectively, in accordance with a grid code of the network, and/or as a function of an initial electrical output power of the power conversion system determined at the first time.

In particular, the maximum value may be in a range from about 5% of the rated power or the initial electrical output power to about 15% of the rated power or the initial electrical output power, more typically about 10%, for example between 9% to 110% of the rated power or the initial electrical output power.

Typically, the monotonic function is a function of a difference between the (current) frequency and the threshold frequency. Accordingly, controlling may be facilitated.

Alternatively or in addition, the monotonic function is a (typically predetermined) configurable function. Accordingly, adaptation to grid codes valid at a specific place of the wind turbine is facilitated.

Further, the monotonic function is typically a piecewise linear function of the (current) frequency and the difference between the (current) frequency and the threshold frequency, respectively. This may also facilitate controlling.

Furthermore, the monotonic function typically increases monotonically with decreasing (current) frequency until the maximum value is reached, and increases monotonically with increasing difference between the (current) frequency and the threshold frequency until the maximum value is reached.

Even further, the monotonic function typically corresponds, prior to reaching the maximum value, to at most about 15%, more typically at most about 12% of the rated power or the initial electrical output power per one Hz (Hertz) of the distance of the frequency to the threshold frequency and/or of the difference between the (current) frequency and the threshold frequency, and/or to at least about 5%, more typically at least about 10% of the rated power or the initial electrical output power per one Hz of the distance of the frequency to the threshold frequency and/or of the difference between the (current) frequency and the threshold frequency.

Further, the monotonic function may be discontinuous at the threshold frequency. More particular, the monotonic function may have two typically predetermined function values at the threshold frequency, typically zero and a response value larger than zero. Accordingly, the wind turbine may more strongly contribute to compensating a grid frequency drop close to the threshold frequency.

For example, the response value may be in a range from about 0 to about 5%, more typically in a range from about 0 to about 1.5% of the rated power or the initial electrical output power.

The threshold frequency is typically lower than a target frequency of the network. At least one of, typically both the threshold frequency and the target frequency are predetermined and/or configurable values, in particular in accordance with a grid code. For example, the threshold frequency may correspond to a deadband frequency of the network as specified in an applicable grid code.

The monotonic function may be constant in a range between the threshold frequency and a hysteresis frequency which is lower than the target frequency and higher than the threshold frequency. In particular, the monotonic function may have a hysteresis between the threshold frequency and the hysteresis frequency. More particular, the monotonic function may have two (predetermined) constant (frequency independent) function values in the range between the threshold frequency and the hysteresis frequency, typically zero and the response value.

Determining the current frequency and operating the power conversion system at the increased electrical output power may be repeated. Accordingly, a dynamic response to changing grid conditions may be provided.

The method may be repeated until a predetermined time interval of e.g. 10 s is reached. Accordingly, an undesired (too strong) deceleration of the moving parts of the power conversion system can be avoided. The predetermined time interval typically depends on the specification of the power conversion system and the wind turbine, respectively.

Typically, operating the power conversion system at the increased electrical output power is stopped when the predefined time interval is reached, when the current frequency is again higher than the threshold frequency, more typically equal to or higher than the hysteresis frequency.

As already explained above, the power conversion system may be operated at the increased electrical output power if the current frequency is in a range between the threshold frequency and the hysteresis frequency.

In one aspect, the present disclosure is directed to power conversion plant, in particular a renewable power conversion plant comprising one or more wind turbines. The power conversion plant includes a rotor, and a power conversion system mechanically connected with the rotor, configured to convert input motive power (provided by the rotor) into electrical output power, and connectable to a network, in particular a utility grid. The power conversion plant further includes a sensor connectable to the network for measuring at least one signal which is at least correlated with a frequency of the network, and a controller communicatively coupled with the power conversion system and the sensor. The controller is configured to receive the at least one signal, and to determine, when the current frequency is equal to or lower than a threshold frequency, an electrical output power increase for the power conversion system in accordance with a monotonic function of the current frequency. The monotone function is limited to a maximum value. Further, the controller is typically configured to use the electrical output power increase for controlling the power conversion system.

The at least one signal may (directly) correspond to the current frequency of the network. In other words, the sensor may include or be a frequency sensor.

The controller may be provided by a turbine controller or a (wind) turbine controller and a converter controller functionally couple with the turbine controller. Further, part of the functionally may also be provided by a wind farm controller supervising the turbine controller.

The term "controller" as used herein shall embrace two or more controllers which are functionally coupled with each other.

Typically, the controller is configured to the control the power conversion system so that the power increase is provided using rotational energy stored in a moment of inertia of the rotor and/or a generator rotor of a generator of the power conversion system. For example, the controller may determine and use respective power setpoints for controlling a converter of the power conversion system.

Further, the controller may be configured to perform the methods as explained herein.

In one aspect, the present disclosure is directed to a computer program product or a computer-readable storage medium. The computer program product or the computer-readable storage medium includes instructions which, when executed by a one or more processors of a system, in particular a controller of the power conversion plant as explained herein, cause the system to carry out the methods as explained herein.

The system and the controller, respectively, can be configured to perform particular operations or processes by virtue of software, firmware, hardware, or any combination thereof.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which refers to the appended figures, in which:

FIG. 5A illustrates a flow diagram of a method for operating a wind turbine according to an embodiment of the present disclosure; and FIG. 5B illustrates a flow diagram of a method for operating a wind turbine according to an embodiment of the present disclosure.

Single features depicted in the figures are shown relatively with regards to each other and therefore are not necessarily to scale. Similar or same elements in the figures, even if displayed in different embodiments, are typically represented with the same reference numbers.

DETAILED DESCRIPTION OF THE INVENTION

Figure 1:
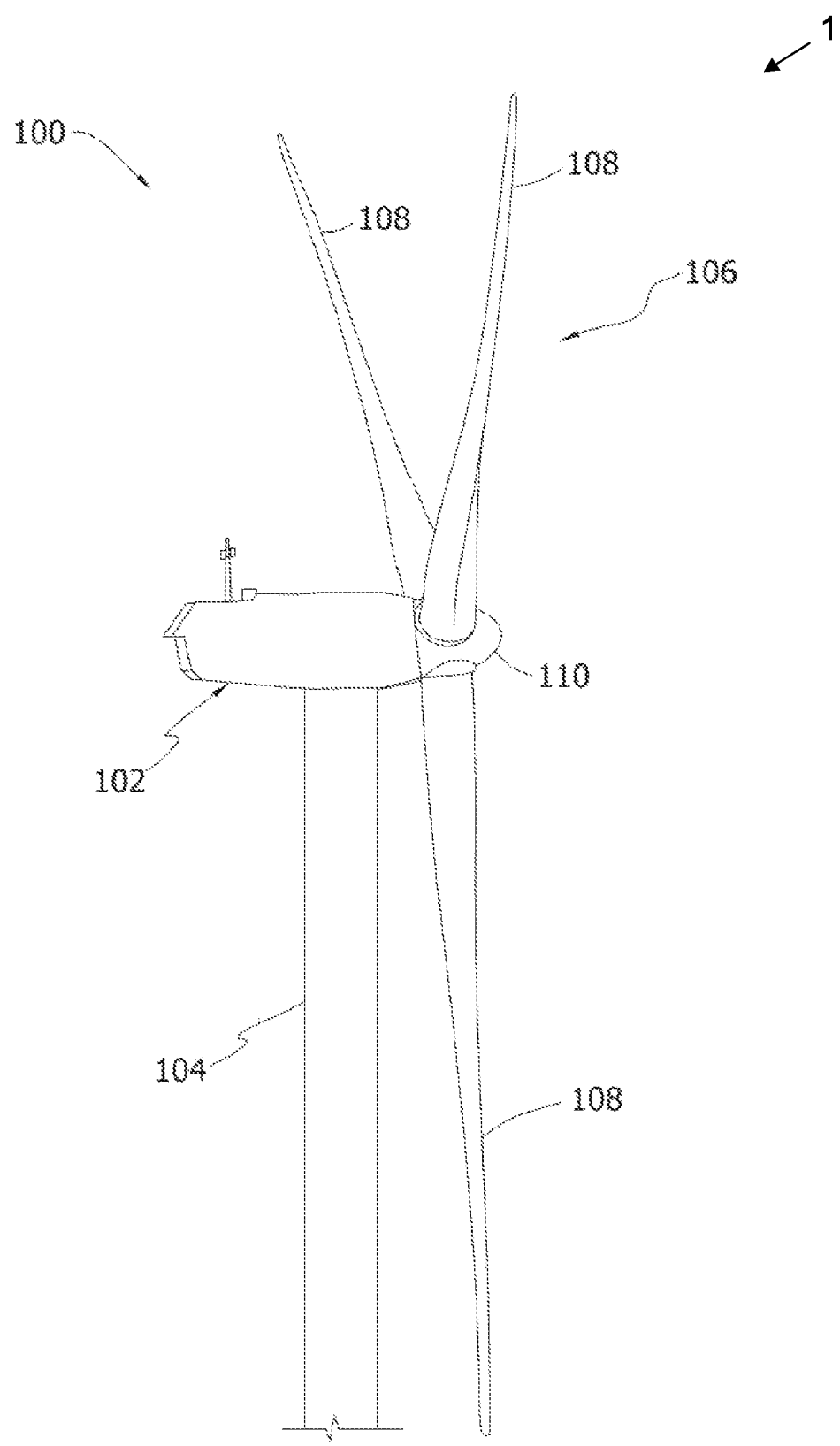
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
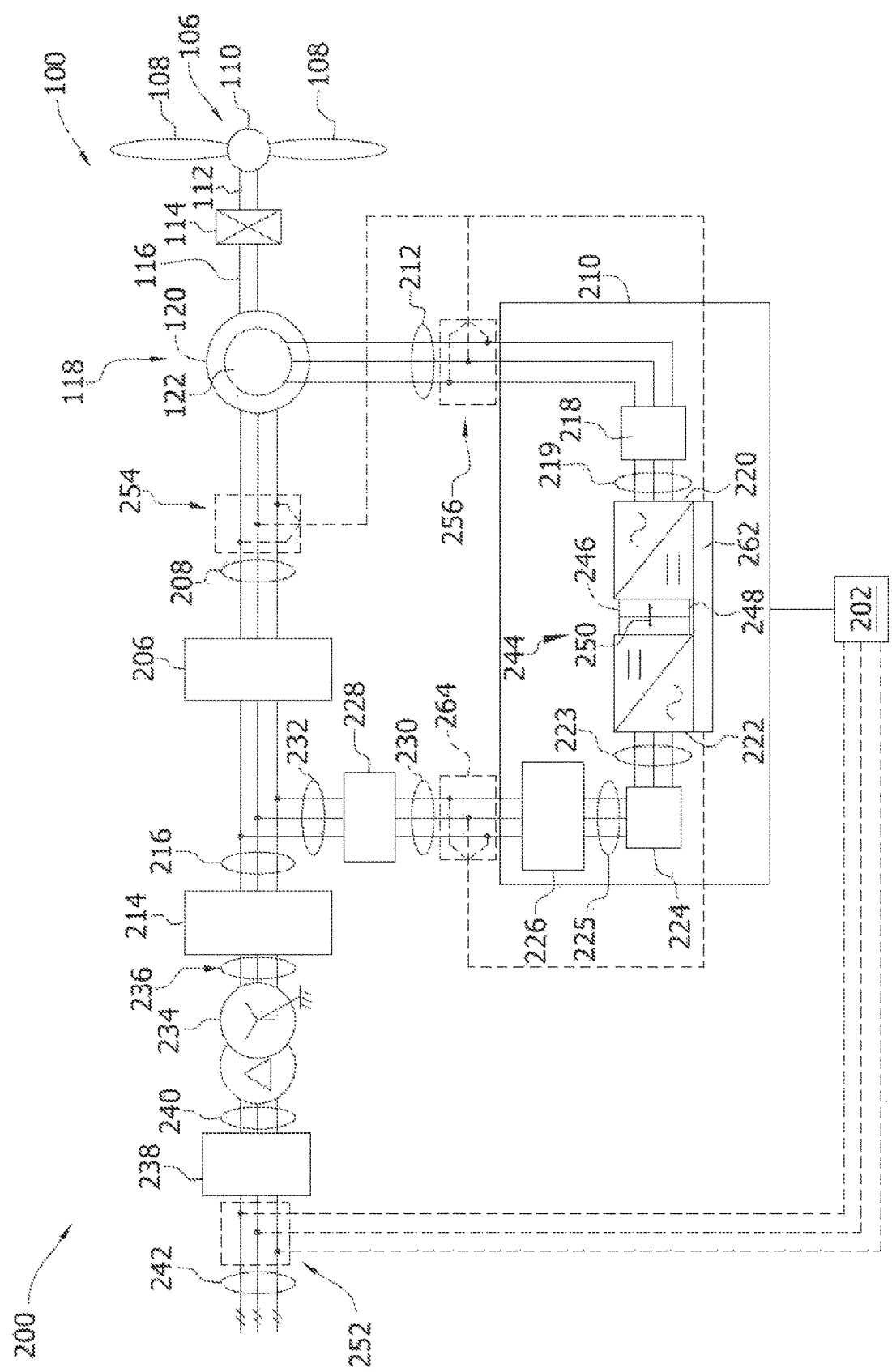
FIG. 2 illustrates a schematic view of one embodiment of an electrical power system and a control system suitable for use with the wind turbine shown in FIG. 1.

Referring now to FIG. 2, a schematic view of one embodiment of an electrical power system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122 having field winding (not shown).

More specifically, in one embodiment, the generator 118 may be a wound rotor, three-phase, doubly-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In such embodiments, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a grid circuit breaker 238, a breaker-side bus 240, and a grid bus 242.

In addition, the electrical power system 200 may include a wind turbine controller 202 configured to control any of the components of the wind turbine 100 and/or implement any of the method steps as described herein. For example, as shown particularly in FIG. 3, the controller 202 may include one or more processor(s) 204 and associated memory device (s) 207 configured to perform a variety of computer-implemented functions (e.g., performing the methods, steps, calculations and the like and storing relevant data as disclosed herein). Additionally, the controller 202 may also include a communications module to facilitate communications between the controller 202 and the various components of the wind turbine 100, e.g. any of the components of FIG. 2.

Figure 3:
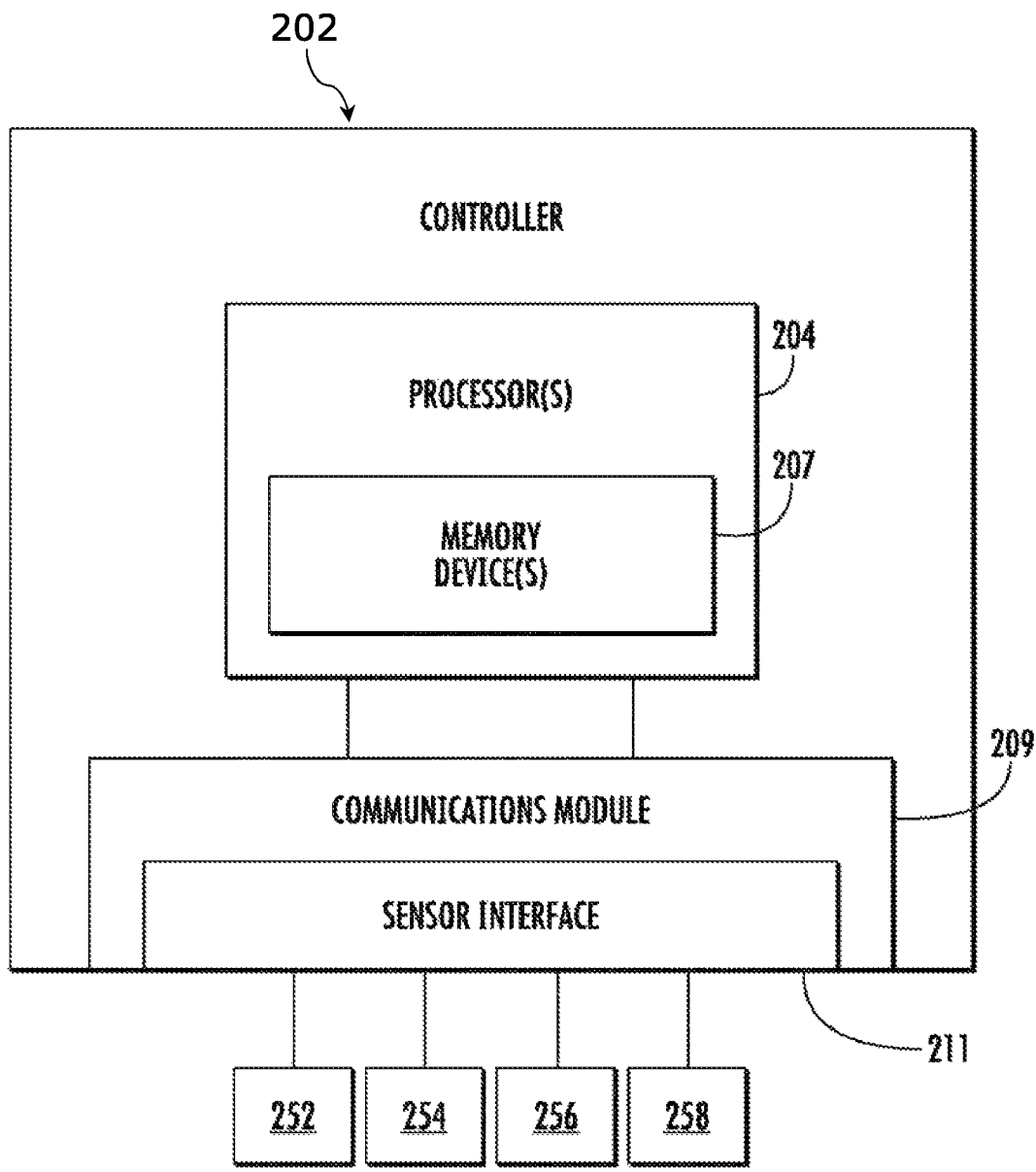
FIG. 3 illustrates a block diagram of one embodiment of a controller suitable for use with the wind turbine shown in FIG. 1.

Further, as shown in FIG. 3, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magnetooptical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Accordingly, a current frequency of the grid may be determined by controller 202. Alternatively or in addition, turbine controller 202 may be functionally coupled with a frequency sensor connectable with the grid. Further, it is possible that controller 202 receives the current frequency of the grid or at least a signal representative for the current frequency of the grid via primary plant controller such as a wind farm controller functionally coupled with a respective sensor.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. In the exemplary embodiment, the associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

In the exemplary embodiment, generator 118, step-up transformer 234 and power conversion assembly 210 electrically coupled to generator 118 and transformer 234 form the power conversion system of wind turbine 100.

Figure 4A:
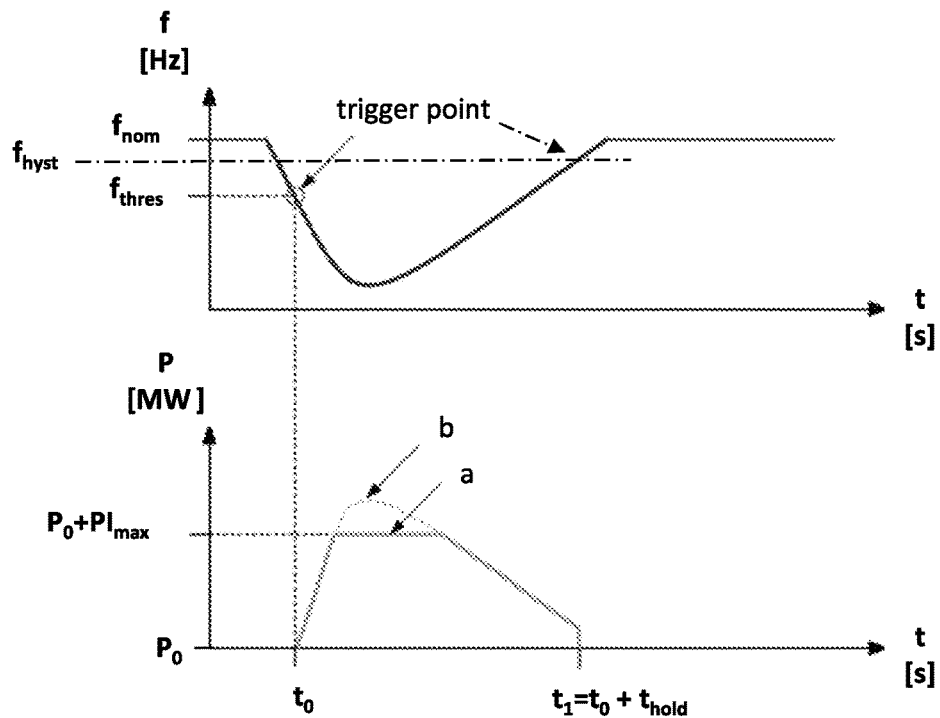
FIG. 4A illustrates a frequency course and an output power as function of time during operating a wind turbine according to an embodiment of the present disclosure.

FIG. 4A illustrates, in the upper part, an exemplary schematic course of a grid frequency f, and, in the lower part, an output power P of a power conversion system of a wind turbine as explained above with regard to FIG. 1 to FIG. 3 as function of time t during operating the wind turbine. The grid frequency is desired to lie in a typically narrow band around the target frequency $f_{nom}$.

At a first time $t_0$, the grid frequency f crosses from above a given or configurable threshold frequency $f_{thresh}$, in particular a deadband frequency of the grid. At this time or shortly thereafter, a dynamic response mode of the wind turbine or even a plurality of wind turbines of a wind power plant connected to the grid may be triggered.

Note that the frequency range $f_{nom}$-$f_{thresh}$ is also known as lower part of the typically configurable frequency deadband, in which no counter action against frequency fluctuations may be required.

During the dynamic response mode, the power conversion system of the wind turbine(s) is (are) operated to provide an increased electrical output power P(t) as illustrated in curve a in the lower part of FIG. 4A.

In the exemplary embodiment, the electrical output power P(t) of the wind turbine(s) is increased from the respective electrical output power $P_0$ at $t_0$ by an electrical output power increase PI(f(t)) as shown in the alternative curves a, b of FIG. 4A, i.e. in accordance with a piece-wise linear function PI(f) of the frequency f which is limited to a configurable maximum value $PI_{max}$ lower than a maximum allowable power increase $PI_{avail}$ as e.g. defined by the grid operator. For even lower grid frequencies f, the power increase PI(f(t)) is kept constant at $PI_{max}$, i.e. independent of the grid frequency.

In other words, during the dynamic response mode (with grid frequency below the frequency dead-band), the power output may be increased proportionally to the dip in frequency up to maximum value $PI_{max}$ as indicated by curves a, c in FIG. 4B that may have a slope in a range from about −7%/Hz to −3%/Hz, more typically a range from about −6%/Hz to −4%/Hz, e.g. about −5%/Hz (assuming that the maximum power increase value $PI_{max}$ corresponds to 10% of the actual electrical output power $P_0$ at $t_0$, and $PI_{avail}$ corresponds to 15% of the actual electrical output power $P_0$ at $t_0$ in FIG. 4A). For reasons of comparison, curves b in FIGS. 4A, 4B correspond to a similar response mode, however without limiting the power increase PI(f(t)) to a value below the maximum allowable power increase $PI_{avail}$. In terms of the rated power or the initial electrical output power, the slope may be equal to or larger than −15% of the rated power or the initial electrical output power per Hz, more typically equal to or larger than −12% of per one Hz and/or smaller than −5%/Hz or even −10%/Hz of the rated power or the initial electrical output power.

Nevertheless, the wind turbine(s) may effectively contribute to stabilizing the grid frequency f when limited to $PI_{max}<PI_{avail}$ during the dynamic response mode as shown in the upper part of FIG. 4A.

The maximum value $PI_{max}$ may be determined as (configurable) fraction or percentage of a possible electrical output power $PI_{avail}$ at $t_0$, the actual electrical output power $P_0$ at $t_0$, or a rated power output of the wind turbine, or any combination thereof, for example as a (weighted) average of two of or all three values.

The dynamic response mode may be active until (at a second time ti) one of the following trigger events occur: (i) a typically configurable predefined time interval $t_{hold}$ is reached, and (ii) the grid frequency f reaches the frequency dead-band again/crosses the hysteresis frequency $f_{hyst}$ from below.

Typically, the dynamic response mode is stopped at ti or shortly thereafter.

Figure 4B:
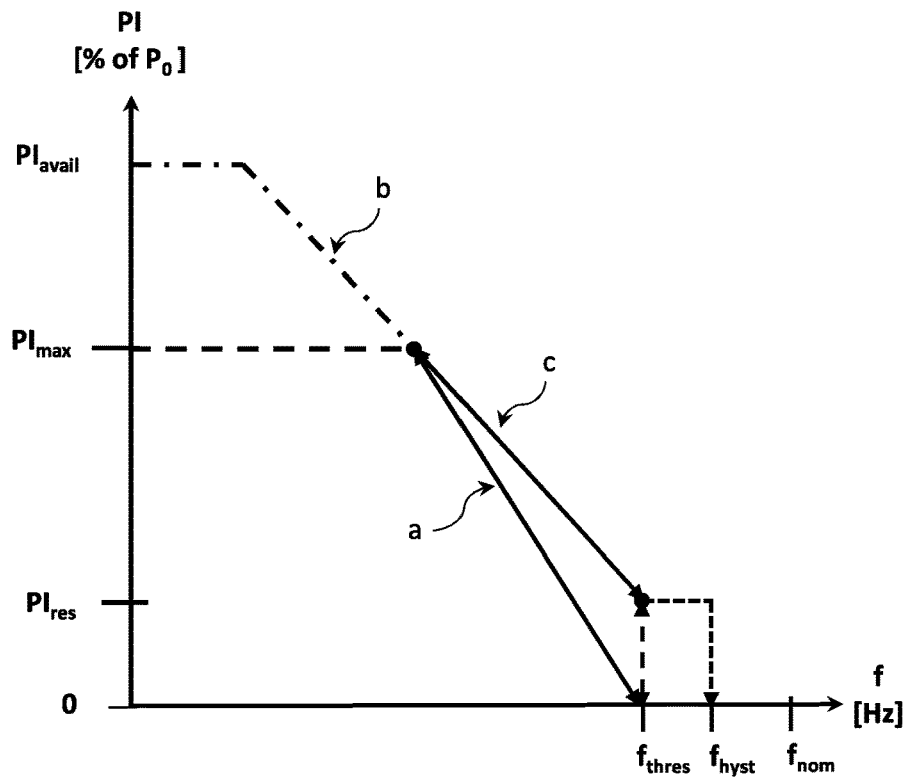
FIG. 4B illustrates a power increase as function of time during operating a wind turbine according to an embodiment of the present disclosure.

As further indicated by curve c and the dashed arrows in FIG. 4B, a hysteresis may be implemented such that the power increase PI is increased from zero to a response value $PI_{res}$ when the threshold frequency $f_{thresh}$ is reached from higher frequency values, and maintained at the response value $PI_{res}$ when the threshold frequency $f_{thresh}$ is reached or crossed from lower frequency values until the grid frequency f reaches or crosses the hysteresis frequency $f_{hyst}$ again.

FIG. 5A illustrates a flow diagram of a method 1000 for operating a wind turbine as explained above with regard to FIG. 1 to FIG. 3.

In a first block 1100, a frequency f of the grid is measured.

In a subsequent block 1300, the power conversion system of one or more wind turbines of a power plant are operated at an increased electrical output power in accordance with a monotonic function as explained herein, in particular with respect to FIGS. 4A, 4B.

FIG. 5B illustrates a flow diagram of a method 1001 for operating a wind turbine as explained above with regard to FIG. 1 to FIG. 3. Method 1001 is similar to method 1000 explained above with regard to FIG. 4A.

However, steps 1101 to 1301 may be performed several times as indicated by the dashed-dotted arrow.

Further, prior to initiating or continuing operating the power conversion system of one or more wind turbines of a power plant with increased electrical output power in block 1301, it is checked in a decision block 1201 if certain condition(s) are met.

In particular it is checked in decision block 1201 if the grid frequency measured in block 1101 is equal to or lower than the threshold frequency $f_{thresh}$.

Depending thereon, method 1001 is continued with block 1301 or ended/stopped.

Further, it may be checked in block 1201 if a predefined time interval $t_{hold}$ has not been reached or crossed after first entering into block 1301. Only if this condition is met, block 1301 is entered again.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. For example, while the written description refers to horizontal axis wind turbines, the embodiments may also refer to vertical axis wind turbines, in particular variable pitch vertical axis wind turbines. Accordingly, operating the rotor to move around a predefined desired angular orientation with respect to the axis of rotation of the rotor in an alternating fashion while the generator is not in a power operating mode may both applied to horizontal axis wind turbines and vertical axis wind turbines. Such other examples are intended to be within the scope of the claims if they include elements that do not differ from the literal language of the claims, or if they include equivalent structural elements with insubstantial differences from the literal languages of the claims.

The present invention is not limited to the above-described embodiments and modifications and may be embodied in various forms within the gist thereof, for example, the technical features of the embodiments referring to operating a wind turbine may be combined with the embodiments referring to designing a wind turbine may be combined, i.e. operating a wind turbine as explained herein may refer to operating a wind turbine designed as explained herein. Further, modifications corresponding to the technical features according to the aspects described in the Summary of the Invention section may be replaced or combined as appropriate to solve some or all of the above-described problems or obtain some or all of the above-described effects. The technical features may also be omitted as appropriate unless they are described as being essential in this specification.

REFERENCE NUMBERS wind turbine 100
nacelle 102
tower 104
rotor 106
blades 108
hub 110
low speed shaft 112
gearbox 114
generator 118
generator stator 120
generator rotor 122
control system 200
turbine controller 202
processor 204
synchronizing switch 206
memory 207
stator bus 208
communications module 209
power conversion assembly 210
sensor interface 211
rotor bus 212
transformer circuit breaker 214
system bus 216
rotor filter 218
filter bus 219
rotor-side power converter 220
line side power converter 222
line side power converter bus 223
line filter 224
line bus 225
line contactor 226
conversion circuit breaker 228
conversion circuit breaker bus 230
connection bus 232
electric power main transformer 234
generator-side bus 236
grid circuit breaker 238
breaker-side bus 240
distribution grid via a grid bus 242
DC link 244
positive rail 246
negative rail 248
capacitor 250
electric current sensors 252
electric current sensors 254
electric current sensors 256
converter controller 262
electric current sensors 264

The invention claimed is:

1. A method for operating a wind turbine, wherein the wind turbine includes a rotor with rotor blades and a power conversion system mechanically connected with the rotor, the power conversion system configured to convert input motive power into electrical output power and electrically connected to a network for feeding the electrical output power to the network, the method comprising:
   determining a current frequency (f) of the network; and
   when the current frequency (f) is equal to or lower than a threshold frequency ($f_{thresh}$), operating the power conversion system to increase an electrical output power (P) by an output power increase (PI) in accordance with a monotonic function (PI(f)) of the current frequency (f), the monotonic function (PI(f)) being limited to a maximum output power increase value ($PI_{max}$) determined as a function of an initial electrical output power ($P_0$) of the power conversion system.

2. The method of claim 1, wherein the monotonic function PI(f) of the current frequency (f) is a function of a difference between the current frequency (f) and the threshold frequency ($f_{thresh}$).

3. The method of claim 2, wherein the monotonic function (PI(f)) is one or more of:
   a piecewise linear function of the current frequency (f) or the difference between the current frequency (f) and the threshold frequency ($f_{thresh}$);
   increases monotonically with decreasing current frequency (f) until the maximum value ($PI_{max}$) is reached; and
   increases monotonically with an increasing difference between the current frequency (f) and the threshold frequency ($f_{thresh}$) until the maximum value ($PI_{max}$) is reached.

4. The method of claim 1, wherein the maximum value ($PI_{max}$) is in a range from about 5% of the initial electrical output power ($P_0$) to about 15% of the rated power or the initial electrical output power ($P_0$).

5. The method of claim 4, wherein the electrical output power increase (PI) is increased proportionally to a dip in the current frequency up to the maximum value ($PI_{max}$), and wherein the monotonic function (PI(f)) corresponds, prior to reaching the maximum value ($PI_{max}$), to a slope of between 5% to 15% of the rated power or the initial electrical output power ($P_0$) per one Hz.

6. A method for operating a wind turbine, wherein the wind turbine includes a rotor with rotor blades and a power conversion system mechanically connected with the rotor, the power conversion system configured to convert input motive power into electrical output power and electrically connected to a network for feeding the electrical output power to the network, the method comprising:
   determining a current frequency (f) of the network;
   when the current frequency (f) is equal to or lower than a threshold frequency (fthresh), operating the power conversion system to increase an electrical output power (P) by an output power increase (PI) in accordance with a monotonic function (PI(f)) of the current frequency (f), the monotonic function (PI(f)) being limited to a maximum output power increase value (PImax);
   determining the maximum value (PImax) as a function of a rated power of the power conversion system or as a function of the initial electrical output power ($P_0$);
   wherein the maximum value (PImax) is in a range from about 5% of the rated power or the initial electrical output power (P0) to about 15% of the rated power or the initial electrical output power (P0); and
   wherein the monotonic function (PI(f)) comprises two function values including a response value ($PI_{res}$) larger than zero.

7. The method of claim 6, wherein the response value ($PI_{res}$) is in a range from about 0% to about 5% of the rated power or the initial electrical output power ($P_0$).

8. The method of claim 1, further comprising repeating the method steps a plurality of times until:
   a predefined time interval ($t_{hold}$) is reached;

the current frequency (f) is again higher than the threshold frequency ($f_{thresh}$); or the current frequency (f) is in between the threshold frequency ($f_{thresh}$) and a hysteresis frequency ($f_{hyst}$) that is lower than the target frequency ($f_{nom}$) and higher than the threshold frequency ($f_{thresh}$).

9. The method of claim 8, wherein the threshold frequency ($f_{thresh}$) corresponds to a deadband frequency of the network.

10. The method of claim 8, wherein the monotonic function (PI(f)) of the current frequency (f) comprises a hysteresis in the range between the threshold frequency ($f_{thresh}$) and the hysteresis frequency ($f_{hyst}$).

11. A power conversion plant, comprising:
a rotor;
a power conversion system mechanically connected with the rotor and configured to convert input motive power into electrical output power, the power conversion system connectable to a network;
a sensor connectable to the network that measures at least one signal correlated with a current frequency (f) of the network;
a controller communicatively coupled with the power conversion system and the sensor, the sensor configured to:

receive and use the at least one signal to determine the current frequency (f);
determine, when the current frequency (f) is equal to or lower than a threshold frequency ($f_{thresh}$), an electrical output power increase (PI) for the power conversion system in accordance with a monotonic function (PI(f)) of the current frequency (f), the monotone function (PI(f)) being limited to a maximum value ($PI_{max}$) determined as a function of an initial electrical output power ($P_0$) of the power conversion system; and
use the electrical output power increase (PI) for controlling the power conversion system.

12. The power conversion plant of claim 11, wherein the power conversion plant includes a wind turbine, wherein the controller is configured to the control the power conversion system so that the power increase (PI) is provided using rotational energy stored in a moment of inertia of the rotor or a generator rotor of the power conversion system.

13. A computer program product or a computer-readable storage medium comprising instructions which, when executed by a controller of a wind turbine power plant, causes the wind turbine to carry out the method according to claim 1.

* * * * *